United States Patent
Schneider

(10) Patent No.: US 9,089,944 B2
(45) Date of Patent: Jul. 28, 2015

(54) DEVICE, TOOL AND METHOD FOR MACHINING OF AN OPTICAL LENS

(75) Inventor: Gunter Schneider, Marburg (DE)

(73) Assignee: Schneider GmbH & Co. KG, Fronhausen (DE)

(*) Notice: Subject to any disclaimer, the term of this patent is extended or adjusted under 35 U.S.C. 154(b) by 137 days.

(21) Appl. No.: 13/885,870

(22) PCT Filed: Nov. 14, 2011

(86) PCT No.: PCT/EP2011/005727
§ 371 (c)(1),
(2), (4) Date: Jun. 27, 2013

(87) PCT Pub. No.: WO2012/065712
PCT Pub. Date: May 24, 2012

(65) Prior Publication Data
US 2013/0273815 A1   Oct. 17, 2013

(30) Foreign Application Priority Data

Nov. 17, 2010  (EP) .................................. 10014693
Dec. 2, 2010   (EP) .................................. 10015217
Mar. 1, 2011   (EP) .................................. 11001651

(51) Int. Cl.
*B24B 13/00*       (2006.01)
*B23Q 3/155*       (2006.01)
*B24B 13/06*       (2006.01)
*B24B 13/005*      (2006.01)
*B24D 13/14*       (2006.01)
(Continued)

(52) U.S. Cl.
CPC ............. *B24B 13/06* (2013.01); *B24B 13/0037* (2013.01); *B24B 13/0055* (2013.01); *B24D 13/147* (2013.01); *G02C 7/021* (2013.01); *B23Q 3/15546* (2013.01); *B23Q 17/0909* (2013.01); *Y10T 483/134* (2015.01); *Y10T 483/174* (2015.01)

(58) Field of Classification Search
CPC   B24B 13/0013; B24B 13/0017; B24B 49/04; B24B 49/16; B24B 37/013; B24B 49/10; B24B 37/30; Y10T 483/134; Y10T 483/10; Y10T 483/123; Y10T 483/174; B23Q 3/15546; B23Q 3/17; B23Q 3/006; B23Q 17/0909
USPC ......... 451/5, 6, 8–10, 21, 58, 66, 69, 70, 362, 451/277; 483/8–9, 5, 1, 33; 409/194, 187
See application file for complete search history.

(56) References Cited

U.S. PATENT DOCUMENTS 3,657,627 A * 4/1972 Inaba et al. .................... 318/601
3,744,124 A * 7/1973 Gardner ............................ 483/8
(Continued)

FOREIGN PATENT DOCUMENTS

DE         198 04 542 A1   8/1999
DE    10 2006 050 426 A1   4/2008
(Continued)

*Primary Examiner* — George Nguyen
(74) *Attorney, Agent, or Firm* — Roberts Mlotkowski Safran & Cole, P.C.; David S. Safran

(57) ABSTRACT

A device, a tool, and a method for machining, especially polishing, of an optical lens by means of a tool are proposed, an information medium on one working surface of the tool being optically acquired and removed as the lens is machined and thus the state of the tool being indicated.

22 Claims, 4 Drawing Sheets

(51) Int. Cl.
*G02C 7/02* (2006.01)
*B23Q 17/09* (2006.01)

(56) References Cited

U.S. PATENT DOCUMENTS

| | | | |
|---|---|---|---|
| 3,760,489 A * | 9/1973 | Griffith | 483/9 |
| 4,019,289 A | 4/1977 | Korver | |
| 4,038,783 A * | 8/1977 | Rosenthal | 451/123 |
| 4,497,029 A * | 1/1985 | Kiyokawa | 700/175 |
| 4,581,810 A * | 4/1986 | Kawakami et al. | 483/1 |
| 5,485,399 A | 1/1996 | Saigo et al. | |
| 5,733,176 A * | 3/1998 | Robinson et al. | 451/41 |
| 5,808,894 A | 9/1998 | Wiens et al. | |
| 6,201,567 B1 * | 3/2001 | Kuroda | 348/86 |
| 6,264,533 B1 * | 7/2001 | Kummeth et al. | 451/8 |
| 6,287,170 B1 * | 9/2001 | Hao et al. | 451/5 |
| 6,344,019 B1 * | 2/2002 | Aizawa | 483/39 |
| 6,478,658 B1 * | 11/2002 | Logan | 451/5 |
| 6,616,513 B1 * | 9/2003 | Osterheld | 451/56 |
| 6,645,132 B2 * | 11/2003 | Yoshinaga | 483/55 |
| 6,659,098 B1 | 12/2003 | Sekiya | |
| 6,785,585 B1 | 8/2004 | Gottschald | |
| 6,813,536 B1 | 11/2004 | Gottschald | |
| 6,872,121 B2 * | 3/2005 | Wiesner et al. | 451/5 |
| 6,932,678 B2 * | 8/2005 | Toyoshima et al. | 451/42 |
| 7,008,310 B2 * | 3/2006 | Andres | 451/398 |
| 7,011,613 B2 * | 3/2006 | Moller et al. | 483/1 |
| 7,014,538 B2 * | 3/2006 | Tietz et al. | 451/56 |
| 7,014,542 B1 * | 3/2006 | Lu | 451/65 |
| 7,111,938 B2 | 9/2006 | Andino et al. | |
| 7,148,806 B2 * | 12/2006 | Anttila et al. | 340/573.1 |
| 7,156,795 B2 * | 1/2007 | Nolte et al. | 483/13 |
| 7,289,873 B2 * | 10/2007 | Redecker et al. | 700/174 |
| 7,422,510 B2 | 9/2008 | Schneider et al. | |
| 7,476,143 B2 | 1/2009 | Shibata | |
| 7,883,303 B2 * | 2/2011 | Tang et al. | 409/232 |
| 8,316,742 B2 * | 11/2012 | Craig et al. | 82/1.11 |
| 8,387,224 B2 | 3/2013 | Arai et al. | |
| 8,460,062 B2 * | 6/2013 | Schneider | 451/42 |
| 8,827,608 B2 * | 9/2014 | Fujimura et al. | 409/193 |
| 2001/0004800 A1 * | 6/2001 | Yoshida et al. | 29/737 |
| 2001/0052416 A1 * | 12/2001 | Wissmach et al. | 173/4 |
| 2002/0003415 A1 * | 1/2002 | Nakai et al. | 318/569 |
| 2003/0060920 A1 * | 3/2003 | Kishlyansky et al. | 700/175 |
| 2003/0156401 A1 * | 8/2003 | Komine et al. | 361/815 |
| 2004/0153259 A1 * | 8/2004 | Lee | 702/34 |
| 2004/0242128 A1 | 12/2004 | Masuko | |
| 2005/0110638 A1 * | 5/2005 | Mohr | 340/572.1 |
| 2006/0142893 A1 * | 6/2006 | Yasugi et al. | 700/174 |
| 2006/0159533 A1 * | 7/2006 | Zeiler et al. | 408/226 |
| 2006/0271263 A1 * | 11/2006 | Self et al. | 701/50 |
| 2007/0021036 A1 * | 1/2007 | Kuebler et al. | 451/5 |
| 2007/0212976 A1 * | 9/2007 | McReynolds et al. | 451/5 |
| 2007/0235133 A1 * | 10/2007 | Benassi | 156/345.12 |
| 2008/0004743 A1 * | 1/2008 | Goers et al. | 700/121 |
| 2008/0051012 A1 | 2/2008 | Akiyama et al. | |
| 2008/0051015 A1 * | 2/2008 | Schneider et al. | 451/67 |
| 2008/0055542 A1 | 3/2008 | Haddadi | |
| 2008/0132147 A1 | 6/2008 | Takeichi | |
| 2008/0132157 A1 | 6/2008 | Schneider et al. | |
| 2009/0029628 A1 * | 1/2009 | Oliver et al. | 451/5 |
| 2009/0067940 A1 | 3/2009 | Arai et al. | |
| 2009/0302122 A1 | 12/2009 | Begon | |
| 2010/0105290 A1 * | 4/2010 | Sakata et al. | 451/6 |
| 2010/0145498 A1 * | 6/2010 | Uchikawa et al. | 700/179 |
| 2010/0171276 A1 * | 7/2010 | Kaneko | 279/142 |
| 2010/0224039 A1 | 9/2010 | Schneider et al. | |
| 2010/0248590 A1 | 9/2010 | Shibata et al. | |
| 2010/0250171 A1 * | 9/2010 | Kozu | 702/81 |
| 2010/0261411 A1 * | 10/2010 | Reinmoeller et al. | 451/5 |
| 2011/0009035 A1 | 1/2011 | Schneider | |
| 2011/0076923 A1 * | 3/2011 | Takeichi et al. | 451/5 |
| 2011/0096290 A1 | 4/2011 | Schneider et al. | |
| 2011/0220519 A1 | 9/2011 | Meschenmoser et al. | |
| 2011/0256806 A1 | 10/2011 | Monnoyeur | |
| 2011/0320029 A1 | 12/2011 | Buchet et al. | |
| 2014/0113527 A1 * | 4/2014 | Lindsay et al. | 451/5 |

FOREIGN PATENT DOCUMENTS

| | | |
|---|---|---|
| DE | 10 2007 007 188 A1 | 8/2008 |
| DE | 10 2007 042 667 A1 | 3/2009 |
| DE | 10 2009 011 194 A1 | 9/2010 |
| EP | 0 849 038 A2 | 6/1998 |
| EP | 1 099 511 A2 | 5/2001 |
| EP | 1 295 962 A1 | 3/2003 |
| EP | 1 847 869 A1 | 10/2007 |
| EP | 1 955 811 A2 | 8/2008 |
| EP | 2 308 644 A2 | 4/2011 |
| JP | 02-172643 A | 7/1990 |
| WO | 01/53038 A1 | 7/2001 |
| WO | 2005/105372 A1 | 11/2005 |
| WO | 2006/046558 A1 | 5/2006 |

* cited by examiner

DEVICE, TOOL AND METHOD FOR MACHINING OF AN OPTICAL LENS

BACKGROUND OF THE INVENTION

Field of the Invention

This invention relates to a device for machining, especially polishing, of an optical lens or some other optical component, a tool for machining, especially polishing, of an optical lens or some other optical component, and a method for machining, especially polishing, of an optical lens or some other optical component.

FIELD OF THE INVENTION

An optical lens, for example, for glasses, should have certain optical properties. The concomitant desired optical data of the lens are determined for example, by an optician. The lenses are then machined or fabricated depending on the respectively desired optical data, the lenses being provided especially with so-called free-form surfaces (for example, progressive lenses, etc.). The following description and this invention relate preferably to these lenses or lens blanks which are machined according to the desired, individualized optical data and are provided in particular with so-called free-form surfaces.

German Patent Application DE 10 2007 007 188 A1 discloses a machining center for machining an optical lens of plastic. This machining center has a workpiece spindle which rotates around one axis of rotation with a holding fixture for a lens. The machining center furthermore has a machining apparatus with a milling tool, a machining apparatus with a turning tool, and a polishing apparatus with a polishing tool. The workpiece spindle can be moved in the direction of the axis of rotation and transversely thereto in order to feed the lens to the different apparatus and to enable the different processes and in doing so to produce especially the desired free-form surfaces on the lens.

German Patent Application DE 10 2007 042 667 A1 and corresponding U.S. Pat. No. 7,422,510 show polishing apparatus for optical lenses. Machining takes place by polishing of the lenses. Polishing tools are used as machining tools.

U.S. Pat. No. 8,387,224 and European Patent Application EP 1 847 869 A1 relate to edge machining of spectacle lenses. Tool detection for identification of a tool and for detection of a state of the tool does not take place.

U.S. Patent Application Publication 2004/0242128 A1 and U.S. Pat. No. 4,019,289 disclose polishing tools which display the wear state. In U.S. Patent Application Publication 2004/0242128 A1, after removing a wear coating, an underlying layer becomes visible. In U.S. Pat. No. 4,019,289, a pattern of depressions is formed in a wear coating, the depth of the depressions constituting a measure of the wear.

In the machining of optical lenses or other optical components, extensive automation is desirable and/or extensive monitoring of the equipment or tools used is desirable or useful.

SUMMARY OF THE INVENTION

The object of this invention is to devise a device, a tool and a method for machining of an optical lens or some other optical component, in which machining can take place with little effort and/or by untrained personnel and/or in which automated machining and/or monitoring is enabled or facilitated.

This object is achieved by a device, by a tool and by a method as described herein.

One aspect of this invention is that the device has an acquisition apparatus for acquiring at least one item of equipment for machining of the lens. The item of equipment is especially a tool. In particular, the acquisition of the item of equipment comprises an identification of the item of equipment or tool and/or acquisition of data or information of the item of equipment or tool and/or acquisition of the state of the item of equipment or tool. This greatly simplifies or facilitates use and operation, especially so that even untrained personnel can be used and/or maloperation or misuse can be avoided or at least minimized and/or so that automated control, machining and/or monitoring is enabled or facilitated.

Preferably, the acquisition of at least one item of equipment or tool takes place automatically, especially via at least one or more corresponding detector apparatus. However, partially manual acquisition can also take place, for example, by manually moving a tool to be detected past a detector apparatus, such as a sensor or reading head. This greatly simplifies or facilitates the use and operation of the device for machining of the lens, especially so that even untrained personnel can be used and/or maloperation or misuse can be avoided or at least minimized.

The acquisition apparatus and/or at least one detector apparatus is or are preferably integrated into the device.

Preferably, the device also has a user guide apparatus for user guidance. This facilitates the use of the device, and thus, the machining of the optical lens. In particular, in this way the effort can be reduced and/or machining can also optionally take place by untrained personnel.

In particular, an item of equipment which is to be replaced or which has been used for desired machining, such as a tool, is preferably displayed by the user guide or user guide apparatus. This greatly simplifies or facilitates the use and operation of the device for machining of the lens, especially so that even untrained personnel can be used and/or maloperation or misuse can be avoided or at least minimized.

In particular, the items of equipment which are to refilled, changed, replaced and which are necessary for the machining are acquired and/or displayed. This greatly simplifies or facilitates the use and operation of the device for machining of the lens, especially so that even untrained personnel can be used and/or maloperation or misuse can be avoided or at least minimized.

Especially preferably, the device or user guide or user guide apparatus is made such that the state and/or the progress of machining are or can be displayed or imparted to a user in some other way. In particular the states or the progress of machining of individual machining apparatus of the device and/or for individual lenses can also be displayed or imparted as required. The output or display takes place especially via a corresponding display apparatus, an interface or the like. To acquire the states, state information or other information corresponding thereto can be exchanged and/or acquired for example, by means of the acquisition apparatus or by means of detector apparatus or the like.

This invention relates primarily to machining, especially polishing, of an optical lens, but in general extends preferably also to the machining, especially polishing, of (other) optical components. This description therefore preferably applies accordingly also to machining of other optical components.

Within the scope of this invention "machining apparatus" is generally defined as any apparatus which allows or performs machining of a lens. In this respect, the term "machining apparatus" also encompasses a polishing apparatus. In particular, however, there is also the concept "machining apparatus for cutting or other forming of the lens." Here, it is especially the aforementioned special machining apparatus with a milling tool, with a turning tool or with another other forming tool.

The partially used term "information" in accordance with the invention encompasses preferably data on at least one or the acquired item of equipment or tool. This information or parts of it are preferably stored or contained in an information medium located preferably on the tool. The information medium can be especially a so-called RFID transponder (chip or apparatus for identification using electromagnetic waves, derived from the English term "radio frequency identification"), or an optical identification such as a so-called bar code, especially a 2D (two-dimensional) bar code.

Preferably, the device has an input apparatus and/or display apparatus, especially in the form of a dialog panel or a screen, possibly equipped as a touch screen. By means of the user guide or menu guide, a user can easily operate the device preferably via the control panel, in particular without special training and/or maloperation can be minimized or avoided.

In particular, the device in accordance with the invention has a common housing for at least one machining apparatus of the device and or other optical apparatus for polishing, cleaning, marking and/or blocking. This allows an especially compact and/or economical structure and/or a simplification of the effort, the control and/or the operation. Furthermore external interfaces which are otherwise necessary for transmission of data or relay of information can be minimized or entirely avoided.

Especially preferably, the input apparatus and/or acquisition apparatus is integrated into the device or is connected permanently to it. This corresponds to the preferred configuration principle of the compact machining center in accordance with the invention. But, the input apparatus and/or acquisition apparatus can also be made as a separate component or part which can be connected directly to the device and which, however, is made preferably specifically for the device and can be connected very easily, especially exclusively to it.

A configuration of the device that is especially advantageous is one in which the lens or the lens blank, especially blocked on a blocking piece, can be inserted or clamped manually into the machining apparatus and/or polishing apparatus and can be removed again from it.

A tool in accordance with the invention for machining, especially polishing, of an optical lens or other optical component is characterized in that the tool has an information medium for identification and/or display of the state of the tool. Especially preferably the information medium contains information for identification of the tool, this identification comprising or enabling especially an acquisition or determination of parameters and/or properties of the tool. The information medium and especially its information can preferably be acquired or read by means of the acquisition apparatus, especially by means of a camera. Thus, in particular monitoring and/or automation of the machining and/or monitoring is enabled or facilitated.

Alternatively or in addition, especially monitoring of the state of the tool is also enabled. For example, the information medium can display the state of the tool, whether the information medium or individual items of information can still be detected or read, and/or by the information medium being removed (at the same time) by the machining and/or during the machining. To do this the information medium is preferably located on a working surface, especially a polishing surface, of the tool, especially preferably imprinted on it. The working surface is especially a surface of the tool which wears or is removed during machining and/or comes into contact with the workpiece.

A method in accordance with the invention for machining, especially polishing, of an optical lens or other optical component is characterized according to one aspect in that an information medium of the tool is removed during machining, and the state of the tool is displayed in this way or by the concomitant at least partial unreadability or removal of the information medium or of information. This enables very simple, economical implementation and/or monitoring of the state of the tool. Thus, in particular, improved monitoring of the quality of the tools, and thus, of the machining can be very easily implemented.

According to another aspect of this invention, a method in accordance with the invention for machining, especially polishing, of an optical lens or other optical component is characterized in that several tools are kept ready in a magazine for alternative use in the machining and a used tool is deposited again at the same location in the magazine to facilitate identification of the tool. Thus, it is especially possible to undertake only an initial identification of the tool, for example, via an information medium or the like, and then to identify the tool via its location in the magazine. The information medium can then be used especially to display the state of the tool, especially preferably, by the information medium being removed in the corresponding use of the tool. The removal state of the information medium then constitutes an indication or display of the state of the tool. This enables or facilitates simple, economical identification of the tools and especially also monitoring of the state of tools.

Individual ones of the aforementioned and following aspects and features of this invention can be combined with one another as desired, but also can be implemented independently of one another.

Other aspects, features, advantages and properties of this invention will become apparent from the following description of a preferred exemplary embodiment with reference to the accompanying drawings.

DETAILED DESCRIPTION OF THE INVENTION

Figure 1:
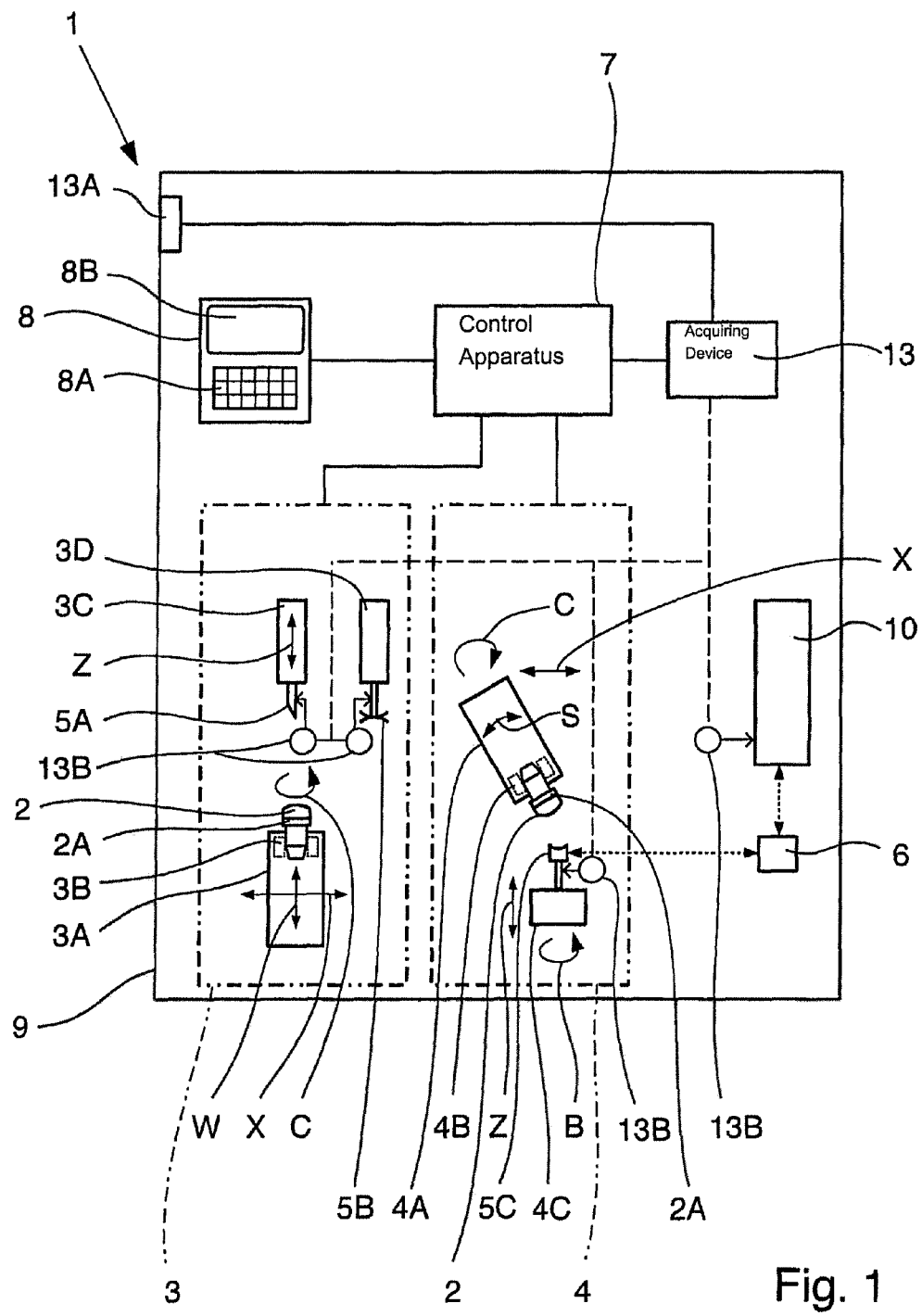
FIG. 1 shows a schematic structure of a device in accordance with the invention.

In the figures, the same reference numbers are used for the same or similar components and apparatus, the same or corresponding advantages and properties arising even if a repeated description is omitted.

The subject matter of the invention is a device 1 for machining of an optical lens 2 or some other optical component, even if in the following only lenses are addressed as the preferred workpiece. Reference should be made, first of all, to the introduction of the specification for the technological background of such a device.

The lens 2 is preferably made of plastic, but fundamentally another material which can be suitably machined, optionally also glass or mineral glass, can also be used. When the finished lens 2 is to be used for eye glasses (not shown), which is preferably the case, the lens 2 of this invention is also called a spectacle lens, even if the lens 2 possibly is not made of glass.

The device 1 in accordance with the invention has at least or exclusively one machining apparatus 3 for cutting or other forming of the lens 2 as a workpiece to be machined. The machining apparatus 3 is indicated only schematically in FIG. 1.

In the illustrated preferred embodiment, the machining apparatus 3 preferably has a workpiece spindle 3A which can be moved preferably in the W direction and X direction, especially by means of a cross slide which is only suggested. The two directions W, X run preferably transversely or perpendicular to one another.

The workpiece spindle 3A is especially a preferably directly driven, precisely mounted shaft or a direct drive or other drive with preferably integrated or assigned interface or holding fixture 3B for the workpiece, here, therefore, for the lens 2 or the lens blank. Fundamentally, direct holding or clamping of the lens 2 can take place. Preferably, the lens 2 or the lens blank can, however, be held indirectly via a fixture, especially a so-called blocking piece 2A. The blocking piece 2A is then clamped.

The lens 2 is temporarily connected to the blocking piece 2A. This state connected to the blocking piece 2A is called "blocked". The blocking, therefore, temporary attachment of the lens 2 to the blocking piece 2A, can take place, for example, by an alloy which melts preferably at low temperature, such as so-called alloy blocking material, a resin, a wax, an adhesive, a plastic, an adhesive tape or the like, and has been known for a long time from the prior art.

The tool spindle 3A, in the illustrated example, preferably, has the holding fixture 3B, especially a collet, for the blocking piece 2A.

The clamping of the lens 2 or of the blocking piece 2A on the workpiece spindle 3A or holding fixture 3B takes place preferably by hand, therefore manually by an operator who is not shown. However, fundamentally, automated clamping is also possible.

The lens 2 and the blocking piece 2A can preferably be clamped in a certain axial position and/or rotary position in order to be able to machine the lens 2 in a defined manner. For this purpose, the blocking piece 2A can also be made in several parts, as is known especially from the prior art.

The clamped lens 2 for machining can be set into rotation by means of the workpiece spindle 3A. Therefore, the workpiece spindle 3A forms especially a drive for turning or rotating the lens 2. The workpiece spindle 3A forms especially a computed or controlled round axis C. In particular, computer numerical control (CNC) of the tool spindle 3A or of the rotation of the lens 2 takes place. Especially preferably, the lens 2 is set into rotation controlled or adjusted with a certain rpm and/or with a defined rotary position.

In the illustrated exemplary embodiment, the workpiece spindle 3A with the clamped or blocked lens blank 2 can preferably be fed in the W direction to a machining tool 5 or positioned and/or can be moved in the X direction transversely relative to the feed direction (cross feed). In particular, a controlled W-axis and X-axis or linear axes are formed. Fundamentally, also other or additional directions and/or axes of movement are possible. In particular, the axial alignment of the axis of rotation or round axis C of the workpiece spindle 3A can also run obliquely to the W-direction or to the X-direction.

The machining apparatus 3 is preferably made for machining of the lens 2 by turning, especially end turning and/or milling. But the machining apparatus 3 can alternatively or additionally enable other machining, especially cutting or forming of the lens 2.

In the illustrated embodiment the machining device 1 preferably has a drive 3C with a turning tool 5A and/or a milling drive 3D with a milling tool 5B. Here, the machining tool 5 is especially therefore a turning tool 5A or milling tool 5B.

The lens 2 and the respective machining tool 5 can preferably be fed and/or moved relative to one another, in order to enable the respective machining.

Preferably, the drive 3C is a complex, preferably electrically operating axle drive, such as a plunger coil drive or the like, especially a so-called fast tool drive, in order to control or rapidly move forward and backward the rotary tool 5A, especially depending on the rotary position of the lens 2 and/or depending on the distance of the tool 5 from the axis of rotation of the workpiece spindle 3A in its axial position or Z axis. The drive 3C allows a preferably linear and/or controlled or adjusted movement of the assigned workpiece 5 and therefore preferably forms a controlled Z-axis.

The direction of the Z-axis, on the one hand, and the direction of the W-axis or the axial alignment of the axis of rotation or the round axis C, on the other, can run parallel to one another or tilted relative to one another and/or can be adjusted relative to one another. For a relative inclination, it is preferably low such that the preferred end turning can take place in the desired or required manner for machining of the workpiece or of the lens 2.

The term "axis" in accordance with this invention, especially preferably in the sense of the terminology for CNC controls (numerical or computed-aided controls) is defined as a controlled or adjusted or computed axis of motion, such as a linear axis or round axis. This applies especially to individual or all parts of a machining apparatus and/or several machining apparatus or to the device 1 in accordance with the invention altogether.

The milling tool 5B and the assigned drive 3D are shown only schematically in FIG. 1. The alignment of the axis of rotation of the drive 3D or milling tool 5B runs preferably transversely or perpendicular to the axial direction of the axis of rotation or round axis C of the workpiece spindle 3A. The milling tool 5B, depending on need and execution, with its alignment of the axis of rotation also obliquely inclined can be aligned or pivoted relative to the axial direction of the axis of rotation or round axis C of the workpiece spindle 3A and/or can be fed relative to the lens 2, for example, by corresponding movement of the workpiece spindle 3A and/or of the drive 3D or milling tool 5B.

In the illustrated and preferred exemplary embodiment, preferably two-stage or multistage machining takes place, in particular the machining apparatus 3 is made preferably in two stages with a more coarsely operating milling tool 5B for coarser machining (preliminary machining) and a more finely operating turning tool 5A for more precision machining (precision machining or primary machining). If necessary, the machining by milling can also be completely eliminated. This leads to a simplification of the device 1 and machining apparatus 3 and allows a more compact and/or more economical structure. If necessary, the rotation can take place in two steps, such as a coarser preliminary turning and later precision turning, preferably with the same turning tool 5A, but also optionally with different turning tools.

In particular, for example, machining can take place in the machining apparatus 3 or there can be a structure, as is described, for example, in European Patent Application EP 0 849 038 A2 or German Patent Application DE 10 2009 011 194 A2 and corresponding U.S. Patent Application Publication 2010/0224039.

Machining by cutting or forming takes place preferably with the feed of liquid, such as a cooling emulsion or the like.

The device 1 alternatively or additionally to the machining apparatus 3 preferably has a polishing apparatus 4 for polishing or final machining of the lens which has been machined preferably beforehand in the machining apparatus 3 or of this lens blank 2. The polishing apparatus 4 constitutes especially a (further) machining apparatus within the scope of this invention and is located in the exemplary embodiment shown in FIG. 1, preferably adjacent to and/or laterally next to the (other) machining apparatus 3.

The polishing apparatus 4 can have a common housing with the machining apparatus 3 or a housing that is separate from it.

The polishing apparatus 4 is built or made especially preferably as described in German Patent Application DE 10 2007 042 667 A1 and corresponding U.S. Patent Application Publication 2011/0009035, and the polishing apparatus 4 according to this invention can also, if necessary, be made only for machining of one lens 2 and not for simultaneous machining of two lenses 2, and therefore, can have only one drive for rotation of the lens 2.

The polishing apparatus 4, in the illustrated example, has preferably a workpiece spindle 4A with a holding fixture 4B. The workpiece spindle 4A can, fundamentally, be built similarly or identically to the workpiece spindle 3A in the machining apparatus 3 and/or can be moved in the X-direction (cross feed) and/or can be pivotable as indicated by the arrow S. In addition, reference is therefore made to the description for the workpiece spindle 3A. In particular, the workpiece spindle 4A is also used as a drive in order to set the lens 2 into rotation for the machining, here the polishing, and/or is used for infeed of the lens 2 to a machining tool 5, here a polishing tool 5C. In particular, the workpiece spindle 4A is a simple rotary drive, for example, a motor with a belt drive in order to set the lens 2 into rotation for the machining or the polishing. Especially preferably the lens 2 or the blocking piece 2A is held without a defined rotary position and/or is rotated simply with a constant (depending on need, optionally controlled or adjusted) rpm.

The polishing can also take place fundamentally only after unblocking, therefore after a release of the lens 2 from the assigned blocking piece 2A. In this case the lens 2 is preferably directly clamped or is held for example, by negative pressure.

The clamping of the lens 2 or of the blocking piece 2A into the workpiece spindle 4A or its holding fixture 4B preferably takes place, in turn, by hand, therefore manually by an operator who is not shown. Accordingly, preferably, also a manual reclamping from the workpiece spindle 3A to the workpiece spindle 4A also takes place. This reclamping can take place fundamentally also automatically by means of a corresponding manipulation or clamping apparatus by the device 1, especially in the same manner as the clamping itself.

The separate drives or workpiece spindles 3A and 4A and/or the holding fixtures 3B and 4B for the machining apparatus 3 on the one hand and the polishing apparatus 4 on the other enable independent machining (polishing is also understood as machining, especially as geometrical or mechanical finishing of a surface) in the two apparatus 3 and 4 so that the throughput of the device 1 for machined lenses 2 is accordingly higher compared to a common workpiece spindle for the two apparatus 3 and 4. But fundamentally, instead of the separate or additional workpiece spindles 4A for the polishing apparatus 4, simply one or the workpiece spindle 3A can be used jointly for the two apparatus 3 and 4. If necessary, the polishing can also take place in the polishing apparatus 4 simultaneously for several lenses 2 at the same time and/or in several machining steps.

Preferably, the polishing apparatus 4 has at least one polishing drive 4C with at least one assigned polishing tool 5C as the machining tool 5. The polishing drive 4C can set the polishing tool 5C into rotation, as indicated by arrow B.

Especially preferably, the polishing tool 5C can be pressed or set in particular with a predetermined force against the lens 2 to be machined or the workpiece, here in the illustrated example in the Z-direction. The pressing or setting can take place, for example, pneumatically, by spring force or in some other way.

In addition or alternatively, the polishing drive 4C and the polishing tool 5C can, if necessary, also be moved or displaced in the X-direction, especially therefore can form or can have a controlled X axis, especially for relative displacement (cross feed) relative to the workpiece or to the lens 2.

In addition or alternatively to the possible pivoting motion S of the workpiece drive or of the workpiece, the polishing tool 5C can preferably be matched in its inclination in an articulated manner to the surface of the lens 2 to be machined preferably via a corresponding joint, such as a ball and socket joint or a universal joint.

A single polishing drive 4C with a single polishing tool 5C is shown. Of course, several drives and/or tools can also be used. In particular, the polishing drive 4C can also be made or supported with several axes. For example, the polishing apparatus 4 can be built or can operate as described in DE 10 2007 042 667 A1 and corresponding U.S. Patent Application Publication 2011/0009035.

Polishing takes place preferably by lapping, especially therefore using a liquid which contains corresponding friction bodies, such as a so-called polishing milk or the like. Alternatively or in addition, polishing can also take place by precision grinding. In particular, instead of lapping also only one clean precision grinding process can take place for finishing of the lens 2 especially prior to subsequent coating of the lens 2.

Fundamentally, the workpiece and tool in the described machining processes, especially in cutting or forming and/or in polishing, can also be interchanged or there can be a kinematic reversal.

The device 1 preferably has a changing apparatus 6 for changing of machining tools 5, especially of the polishing tool 5C or of the polishing tools 5C, as indicated schematically in FIG. 1. This facilitates at least largely automated machining, especially polishing, of the lens 2.

The device 1 preferably has a control apparatus 7 for control of the machining of the lens 2 or of the machining apparatus 3 and/or the polishing apparatus 4. The control apparatus 7 is indicated schematically in FIG. 1.

It is noted that the control apparatus 7 can contain or can be formed by a memory-programmable control, CNC control (numerical or computed-aided control) or the like and/or can control such a control. The control apparatus 7 or parts of the control can also be combined as desired for the apparatus 3, 4, 6, 10 and/or can be distributed as desired among the apparatus 3, 4, 6 and/or 10 or can be formed only by them.

The control apparatus 7 is provided on the input side with or is connected to an input apparatus 8 of the device 1.

The input apparatus 8 in the exemplary embodiment preferably has a control panel 8A for manual input and/or a display apparatus 8B, here in the form of a screen, especially for user guidance. The input apparatus 8 can if necessary also have a touch screen alternatively or in addition to the control panel 8A. This touch screen can if necessary be formed by the display apparatus 8B and/or an additional screen.

The display apparatus 8B is preferably used for user guidance for (easy) operation of the device 1. Especially preferably the device 1 has only a single display apparatus 8B or only a single screen in order to enable a simple, economical structure and/or to enable or facilitate especially simple operation, also by at least largely untrained personnel.

The display apparatus 8B can preferably be a dialog panel, especially a touch screen. Then the control panel 8A which is shown in FIG. 1 as a keyboard is in fact integrated into the screen 8B. Of course, rather traditional outfitting with a keyboard as the control panel 8A is likewise possible.

Furthermore, a user guide apparatus which is not shown can be integrated into the device 1 or control apparatus 7 and then enables feedback to the user or operator or the user guidance especially via the display apparatus 8B of the input apparatus 8.

The illustrated and preferred exemplary embodiment shows the device 1 as a compact machining center, here and according to the preferred teaching in or with a common frame or housing 9. In this way the device 1 in accordance with the invention can be installed preferably completely with all apparatus at a suitable location. In particular, here, it is a compact device 1 in the form of a machining center which can be set up anywhere.

The device 1 is preferably assigned a holding apparatus 10 for holding an item of equipment, especially lenses 2 and/or tools 5. The holding apparatus 10 can also form one part of the device 1 or can be connected permanently to it or the frame or housing 9 of the device 1. But it can also be an apparatus which is separate or which can be separated from the device 2.

Figure 2:
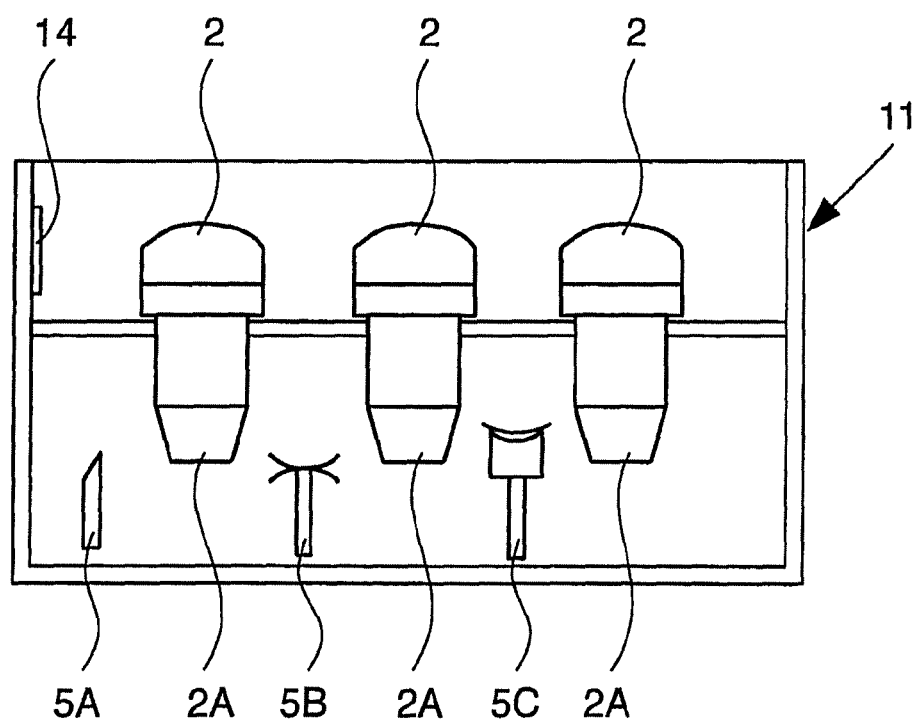
FIG. 2 shows a schematic, section-like view of a transport container for one or more lenses and tools with an information medium for the device.

The holding device 10 can be made, for example, for holding of a transport container 11 which is shown by way of example in a schematic section in FIG. 2. This transport container 11 is then preferably for its part made preferably for holding or making available especially blocked lenses 2 and/or machining tools 5 such as turning tools 5A, milling tools 5B and/or polishing tools 5C.

The transport container 11 can, for example, contain or accommodate various tools 5 for different machining processes or lenses 2 and/or tools 5 for replacement and/or other items of equipment, such as coolants, polishing agents, coating agents, detergents, blocking material or the like, and/or other aids such as gloves, cleaning cloths or the like.

Especially preferably, the transport container 11 is a container which provides the user or the device 1 especially with all lens blanks, materials and/or information which are required for machining.

Figure 3:
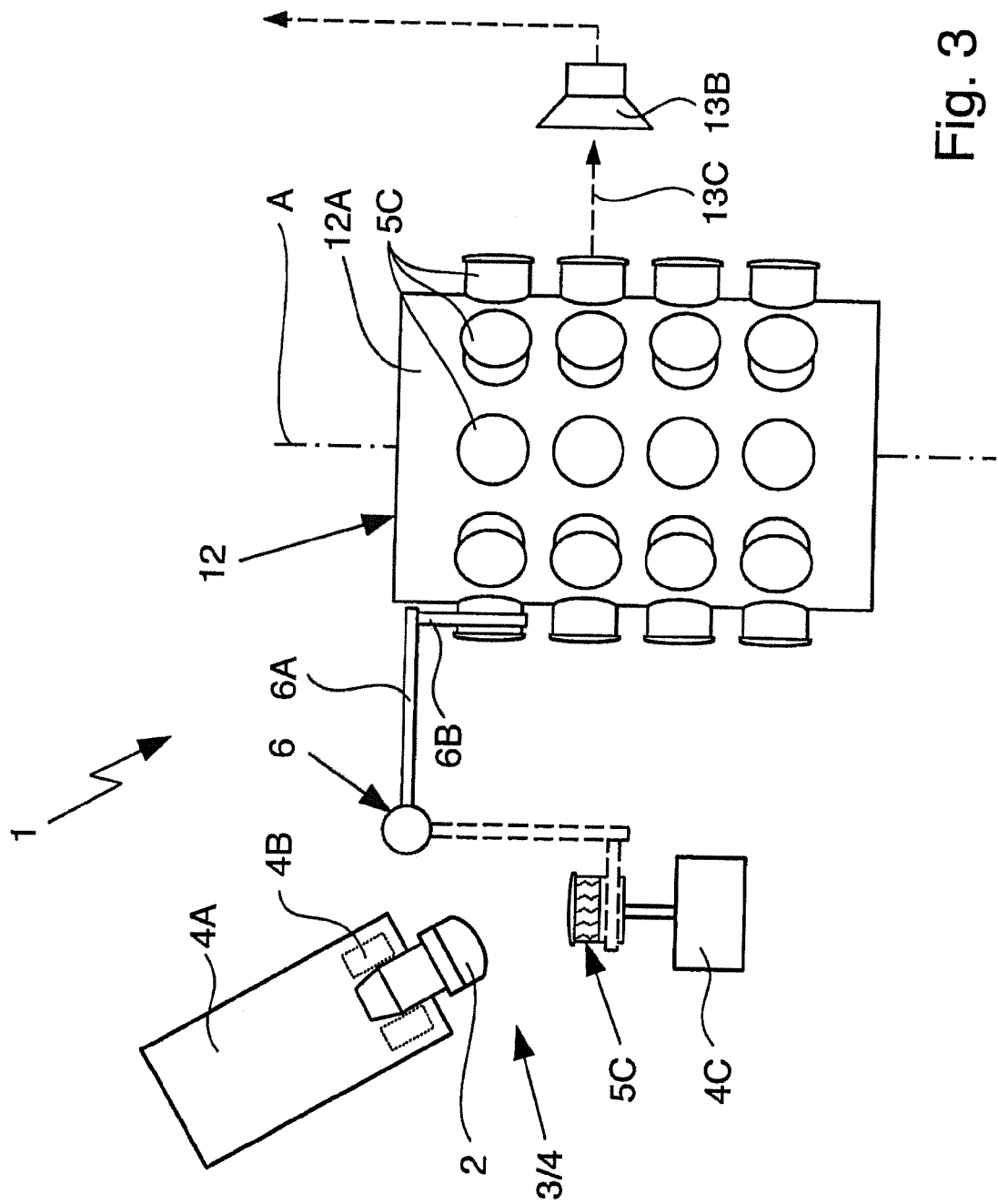
FIG. 3 shows a schematic structure of the device in accordance with the invention having a polishing apparatus as the machining apparatus and an assigned magazine as a holding apparatus for tools.

The holding apparatus 10 can, however, also be formed or made as a magazine 12 for holding or making available tools 5, especially polishing tools 5C, as indicated especially in the schematic according to FIG. 3 or can have such a magazine 12 or can be made for accommodating this magazine 12. The magazine 12 can however also be assigned to the device 1 in some other way and/or can form a part or an apparatus of the device 1.

The holding apparatus 10 or the magazine 12 preferably has a magazine body 12A which is especially at least essentially cylindrical for detachable holding of the tools 5, especially polishing tools 5C. In particular, the tools 5 can be attached by insertion or clamping at certain locations, therefore storage sites.

In the illustrated example, the tools 5 and their storage sites are arranged distributed over the periphery and/or axially on the magazine 12 or magazine body 12A. In other words, the magazine or magazine body 12A preferably has defined or correspondingly arranged holding apparatus, holding devices or the like at certain storage sites.

In the illustrated example, the magazine or magazine body 12A can preferably be turned, here around the indicated axis A. In particular, it is a central axis or axis of rotation of the magazine body 12A here.

In the illustrated example, the optional changing apparatus 6 is used preferably for automated changing of the tools 5 or polishing tools 5C.

The changing apparatus 6 preferably has an especially also multijointed arm 6A and/or a gripper 6B. As indicated in the schematic according to FIG. 3, the changing apparatus 6 or the gripper 6B can grab a tool 5 or polishing tool 5C out of a holding apparatus 10 or the magazine 12 and can equip the assigned machining apparatus, here the polishing tool 4 or its drive 4C or the like, with it, as indicated by the broken line in FIG. 3.

The changing apparatus 6 can preferably remove no longer needed or already used or used-up tools 5 of the assigned machining apparatus, here the polishing apparatus 4, and especially feed then again to the holding apparatus 10 or the magazine 21, especially deposit them on the magazine body 12A or attach them to it, for example, by clamping or locking at a corresponding storage site.

Especially preferably, the same position or the same storage site on the magazine 12 can be used for a tool 5 or polishing tool 5C.

To facilitate or accelerate tool changing, the changing apparatus 6 or the gripper 6B can also be made such that two tools 5 can be gripped, for example, one used and one new tool 5.

As already mentioned, the changing apparatus 6 and the automated changing of tools 5, especially polishing tools 5C, are optional. Fundamentally manual changing or other changing can also take place.

The device 1 preferably has an acquisition apparatus 13 for acquiring at least one item of equipment (for example, existing or missing or to be replaced), especially from information with respect to the item of equipment or tool 5, especially from an information medium 14 which contains the information and which is assigned to the item of equipment.

The acquisition apparatus 13 can be integrated into the input apparatus 8 or can be formed from the latter. Preferably the acquisition apparatus 13 is however a separate apparatus which however especially preferably is integrated in turn into the device 1 or is connected permanently to it and/or is joined or can be joined especially permanently to it.

The device 1 or acquisition apparatus 13 preferably has a detection apparatus 13A and/or 13B for acquisition of the tools 5 or the information. For example, it can be a reading head, a sensor, a camera or the like or can be formed by them.

The detection apparatus 13A is preferably integrated into the device 1 or the acquisition apparatus 13 or is connected permanently to it and/or is joined or can be joined especially permanently to it.

The acquisition apparatus 13 or detection apparatus 13A, 13B is especially made such that the information is acquired, read out, and/or detected optically, magnetically, electromagnetically and/or in some other suitable manner and/or the information medium 14 is read out in this way. The information and data which have been acquired or detected by the detection apparatus 13A, 13B are processed for example, by the acquisition apparatus 13, especially such that the information is output and especially relayed to the device 1 or the control apparatus 7 or other components or apparatus. In particular, the acquisition apparatus 13 can control the detection apparatus 13A and/or 13B in a suitable manner.

The acquisition apparatus 13 or detection apparatus 13A, 13B can be located separately from the other apparatus of the device 1 or an apparatus, especially the machining apparatus 3, or a holding fixture 3B or 4B, or can be assigned preferably to the magazine 132 or can be located on it or in it.

In particular, the device 1 or the acquisition apparatus 13 or the detection apparatus 13A, 13B is made such that the information can be automatically acquired or read.

If necessary, the device 1 can also have several detection apparatus 13A and/or 13B which are assigned for example, to various apparatus 3, 4, 6, and/or 10 of the device 1, especially to be able to check or verify, using the information then detected or acquired, that the correct machining or treatment is taking place.

The information within the scope of this invention relates especially to at least one item of equipment or several or all items of equipment for machining of the lens 2, especially for certain machining or for a certain lens 2 and/or for operating the device 1.

An "item of equipment" within the scope of this invention is or comprises especially one tool 5, such as the turning tool 5A, the milling tool 5B and/or the polishing tool 5C or the like, and/or a polishing agent, a coolant, a lubricant, a detergent and/or a liquid or the like.

The information can also relate to or comprise an identification of one item of equipment and/or the fill level of an item of equipment, the presence of an item of equipment, the state of an item of equipment or the like.

Preferably, the information relating to at least one item of equipment can be acquired from the device 1 or its acquisition apparatus 13 (likewise), especially at least partially automatically and/or by corresponding input, for example, via the assigned input apparatus 8. Especially preferably the device 1 or acquisition apparatus 13 for this purpose has at least one, preferably several corresponding detection apparatus 13B, as is indicated schematically in FIG. 1.

The device 1 or acquisition apparatus 13 can have detection apparatus 13B for acquisition and/or monitoring of items of equipment in addition or alternatively to the detection apparatus 13A which is assigned preferably to the lens 2.

The detection apparatus 13D, especially like the detection apparatus 13A, can be connected permanently to the device 1 or its housing 9 or integrated into it and/or can be connected or connectable permanently or detachably to the device 1, control apparatus 7 and/or acquisition apparatus 13 and/or can transmit wirelessly or by radio corresponding data or information, especially to the device 1, control apparatus 7 and/or acquisition apparatus 12, as indicated by way of example by the broken lines in FIG. 1.

The detection apparatus 13A and/or 13B are especially corresponding sensors, sensor apparatus, optical apparatus, cameras, liquid level gauges, proximity switches, microswitches or the like. If necessary, several or different detection apparatus 13B can also be combined and/or can be used for acquisition of information with respect to one item of equipment.

Preferably, some or all detection apparatus 13B are located in the vicinity of the item of equipment which is to be monitored or acquired or are in the respective installation state or site of use of the item of equipment in the device 1 and/or are assigned to the respective machining apparatus 3 and/or 4 or other apparatus, such as the holding apparatus 10, the transport container 11 and/or the magazine 12.

For example, a detection apparatus 13B can be assigned to the machining apparatus 3 or the drive 3C, here the fast-tool drive, or the turning tool 5A, especially in order to acquire and/or monitor, optionally also continuously, the installed machining tool 5, here the turning tool 5A, and/or its type, size, state, wear or the like.

For example, a detection apparatus 13B can be assigned to the machining apparatus 3 or the drive 3D, especially in order to acquire and/or monitor, optionally also continuously, the installed machining tool 5, here the milling tool 5B, and/or its type, size, state, wear or the like.

For example, a detection apparatus 13B can be assigned to the polishing apparatus 4 or the drive 4C especially in order to acquire and/or monitor, optionally also continuously, the attached polishing tool 5C, for example, its type, size, state, wear or the like. Alternatively or in addition, this monitoring or acquisition can also take place on the magazine 12, especially by a detection apparatus 13B which is assigned to the magazine 12, as indicated in FIG. 3, especially in order to acquire and/or monitor the presence, the state, and/or the type, size or the like of tools 5 and/or other items of equipment, optionally also continuously.

Alternatively or in addition, a detection apparatus 13B can also be assigned to the holding apparatus 10, as indicated in FIG. 1, especially in order to acquire and/or monitor the presence and/or the type, size or the like of accommodated items of equipment and/or the presence or the type of a transport container 11 held therein or of items of equipment contained in the transport container 11, optionally also continuously.

The acquired or detected information, especially with respect to items of equipment, can be used, further processed and/or evaluated and/or displayed especially via the display apparatus 8, or in some other way output or protocolled by the device 1, acquisition apparatus 13 and/or the control apparatus 7, preferably together with completed lens machining processes.

If necessary, the preferably automatically acquired or detected information can generally also be corrected, especially by means of the input apparatus 8A or in some other way.

The information relating especially to a tool 5 or an information medium 14 provided with it is assigned to the tool 5 according to one preferred configuration, especially is located on it, connected permanently or undetachably to it and/or is applied to it or integrated into it.

The information medium 14 is especially an RFID chip or transponder, a mechanical and/or optical marking, especially a bar code, especially preferably a two-dimensional bar code, some other marking, some other identification means or the like.

The information medium 14 contains the information, depending on need, in coded or uncoded form. In particular the information contains an identification of the respective tool 5.

The information or data which relate especially to the tool 5 and which contain this information are preferably acquired or read out by the acquisition apparatus 13 or detection apparatus 13B, especially via a corresponding signal exchange, or a detection signal 13C, as indicated schematically in FIG. 3. This takes place especially optically here. These data—especially video data and/or film data, preferably from a camera or the like as detection apparatus 13B—are then evaluated preferably in the device 1 or acquisition apparatus 13 especially with respect to the information and are made available especially for further processing or for the further operation or functional sequence of the device 1 or for other components or apparatus of the device 1, for example, the control apparatus 7.

The aforementioned detection, reading, or acquisition of data from the information medium 14 takes place especially optically, by radio, magnetically, electromagnetically and/or in some other suitable manner. For example, an RFID chip or transponder as an information medium 14 is read out by radio or via an RFID signal. For example, an optical marking or a bar code as the information medium 14 is optically detected or scanned. For example, the information medium 14 can also be some chip or microchip, especially an EPROM or EEPROM, and/or magnetic data storage or the like. The device 1 or acquisition apparatus 13 or the detection apparatus 13A/13B is made accordingly, for example, provided with a corresponding RFID receiver or interrogation device, a camera, some other sensor or the like.

Individual items of equipment, especially individual tools or all tools, can be provided with the corresponding information or a corresponding information medium 14, especially a bar code.

Figure 4:
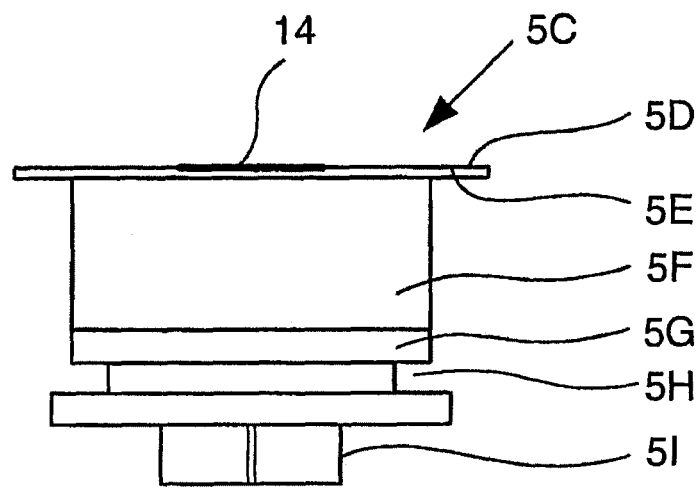
FIG. 4 shows a schematic side view of a tool in accordance with the invention.

FIG. 4 shows in a schematic side view a tool 5 in accordance with the invention which is made or executed especially as a polishing tool 5C.

The tool 5 or polishing tool 5C preferably has one working surface 5D which during machining comes into contact with the lens 2 or in some other optical component and is removed or wears especially in doing so.

In the illustrated example, the working surface 5D is located or formed on one side, especially the flat side, of the tool 5 or an especially flat tool element, such as a polishing pad 5E. The machining element or tool element or polishing pad 5E of the tool 5 is especially a nonwoven-like, film-like, felt-like or fabric-like element or flat article or the like.

In the illustrated example, the tool 5 or polishing tool 5C preferably has a connecting body 5F which holds or supports the machining element or polishing pad 5E preferably on the back and/or over a large area.

The connecting body 5F is preferably made foam-like or elastically compliant and/or produced from plastic.

The connecting body 5F is preferably held or attached for its part on a retaining body 5G of the tool 5 or polishing tool 5C. In the illustrated example the retaining body 5G preferably has an engagement possibility such as a groove 5H, especially a peripheral annular groove, for detection, especially gripping, of the tool 5, especially by means of the changing apparatus 6 or its gripper 6B.

The retaining body 5G is preferably provided with a connecting element 5I for detachable connection of the tool 5 or polishing tool 5C to a machining apparatus, in particular an assigned drive 4C, and/or the magazine 12 or the like, for example, by a clamping or snap connection or the like.

Figure 5:
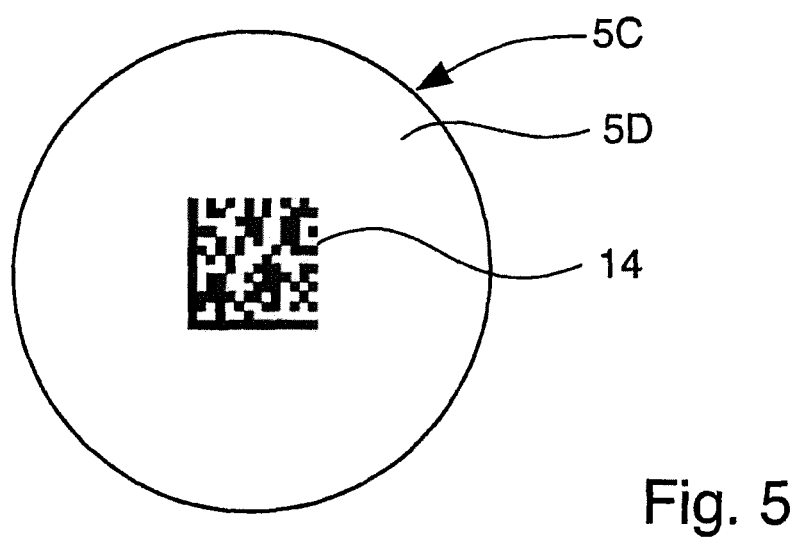
FIG. 5 is a plan view of a portion of the tool according to FIG. 3.

The tool 5 or polishing tool 5C is preferably provided with an information medium 14 in the indicated sense. The information medium 14 is preferably located on the working surface 5D of the tool 5, as shown in the plan view of the polishing tool according to FIG. 5, especially preferably imprinted onto the tool 5, the working surface 5D or the machining element or polishing pad 5E.

The information medium 14 or bar code is preferably printed on the working surface 5D or applied in some other suitable manner. Alternatively or in addition the working surface 5D or the polishing pad 5E can also contain a layer or substrate with a certain pattern or certain information or the like as the information medium 14.

The information medium 14 is especially a so-called bar code, here especially preferably a two-dimensional bar code.

The information medium 14 or bar code is preferably provided with redundant information. For example, the information or individual items of information can be present twice, three times, four times or generally repeatedly, for example, for an information medium 14 or bar code which is unreadable in regions, to nevertheless enable acquisition and read-out of information in the other regions. This is especially provided in the arrangement preferred here on the working surface 5D or on a tool 5 or polishing tool 5C and/or for display of the tool state.

For example, the information in the information medium 14 can also be displayed differently or for example, can have different bar widths or the like.

Preferably, the wear or the state of the information medium 14 and/or of the tool 5 or polishing tool 5C is determined or estimated from the decreasing or no longer existing readability or detectability of the information medium 14 or of information of the information medium 14 or of regions or parts of the information medium 14.

The corresponding also applies especially when the information medium 14 is formed by a certain or uniform pattern, especially on the working surface 5D, in one region or several regions or over the entire surface. For example, the information medium 14 or the pattern which has been formed by it or the like can at least essentially completely cover or blanket the working surface 5D.

Alternatively or in addition, several and/or separate and/or different information media 14 can be located or distributed on the tool 5 or polishing tool 5C and especially on the working surface 5D.

In the embodiment shown in FIG. 3, the acquisition apparatus 13 or a detection apparatus 13B for especially optical acquisition of information or an information medium 14, here especially preferably in the form of a camera, is assigned to the holding apparatus 10 or the magazine 12 for the items of equipment or tools 5.

Preferably, the detection apparatus 13B or camera can be moved relative to the magazine 12 or magazine body 12A or to the different storage sites, here for example, by axial or rotary motion, such that the tools 5 located at the different storage sites or their information media 14 can be acquired or read out.

Especially preferably, initial read-out of the information medium 14 for identification of the assigned tool 5 or polishing tool 5C takes place in first-time placement of the tool 5 or replacement of the tool 5 by a new tool on the magazine 12.

The tool 5, which is required for certain machining or for a lens 2, is then removed by the changing apparatus 6 if necessary from the magazine 12 and used, especially in a machining apparatus or in the polishing apparatus 4. After use, the tool 5 is deposited or placed again at its original storage site on or in the magazine 12 or on the magazine body 12A. In this way, unambiguous identification of the respective tool 5 by the device 1 or acquisition apparatus 13 and/or the functional sequence are altogether facilitated or simplified.

After the first-time identification, the acquisition apparatus 13 or detection apparatus 13B can continue to read out the information medium 14 of the already used tool 5 to the extent the information medium 14 or at least parts of it or the information can be at least still partially read out. Then, the state (for example, wear or state of abrasion) of the tool 5 or the working surface 5D can be acquired from this readability or nonreadability, especially determined or estimated. This determination or estimation can take place, for example, in the acquisition apparatus 13 and/or in other apparatus, such as the control apparatus 7 of the device 1.

The acquired state of the tool 5 can preferably be displayed, retrieved, stored and/or output—especially preferably together with a certain lens 2 and/or machining.

If it is ascertained that the tool 5 or polishing tool 5C or its working surface 5D has been removed (too far or too dramatically) and/or the information medium 14 and/or certain information of the information medium 14 is no longer readable or only poorly readable and/or if a corresponding threshold of nonreadability or optical detectability is reached or exceeded, the further use of the corresponding tool 5 can be blocked by the device 1 or control 7. Alternatively or in addition, the further machining can take place without this tool 5 and/or a required replacement of this tool 5 can be induced and/or displayed, especially via the display apparatus 8B.

Monitoring of the state, wear or abrasion of the tool 5 or working surface 5C can prevent continued use of too heavily worn or abraded tools 5 for machining. Accordingly the quality of machining can be improved or ensured in this way.

The acquisition apparatus 13 or detection apparatus 13A or 13B or optical acquisition can be used alternatively or additionally also for detecting possible cracks, chips, or other irregularities or damage of the tool 5 or of the working surface 5D.

The acquisition apparatus 13 or detection apparatus 13A or 13B or optical detection can alternatively or additionally also be used to detect possibly present residues of polishing agents on the tool 5 or on the working surface 5D or on the information medium 14. Especially preferably, the detection of a dried polishing agent, especially on the working surface 5D or the information medium 14, is enabled, for example, based on a corresponding change of the optical properties. In this way the use of a tool 5 with polishing agent dried on it or in it for further machining can be prevented since this could lead to unwanted damage of the workpiece or the lens 2.

The information which can be acquired or read out with respect to the tool 5, especially a polishing tool, contains especially preferably data on the size and/or diameter, especially of the working surface 5D or of the polishing pad 5E, and/or with respect to the effective machining diameter or region, such as of an annular region which is essentially effective in machining or the like, and/or with respect to a curvature or precurvature of the working surface 5D and/or with respect to the material of the polishing pad 5E.

Alternatively or in addition, the acquisition apparatus 13 can also be used to ascertain which items of equipment or tools 5 are available at all. Based on this knowledge, then optimum machining using only existing items of equipment or tools 5 can be fixed or proposed especially by the device 1 or its control 7. This can take place automatically or and/or with corresponding information or display for the user or selection by the user.

In addition or alternatively to an assignment of information media 14 to items of equipment or on tools 5, an (optionally additional) information medium 14 can also be connected permanently or undetachably to a transport container 11, as indicated in FIG. 2. Alternatively, this information medium 14 can also be detachable therefrom, and for example, can be inserted into the acquisition apparatus 13 or its detection apparatus 13A or can be joined to it, especially for readout of information.

The information or information medium 14 of the transport container 11 can also be read out, for example, by the transport container 11 being held by the device 1 or its holding apparatus 10. In this case, the transport container 11 or the information medium 14 can be read out, for example, via corresponding electrical terminals or the like or can be connected or joined to the device 1 or acquisition apparatus 13 or detection apparatus 13B.

The information medium 14 of the transport container 11 can also comprise especially information with respect to the items of equipment which are necessary and/or are contained in the transport container 13.

The information can be read out from the information medium 14 of the transport container 11 and/or from individual information media 14 of the items of equipment especially preferably via a detection apparatus 13B which is assigned accordingly to the transport container 13 or the holding apparatus 10, optionally even automated or automatically, for example, when the transport container 11 is inserted into the device 1 or holding apparatus 10.

Preferably, which items of equipment, especially tools, are available, can be acquired, recorded, ascertained and/or evaluated by the device 1 or the acquisition apparatus 13 or the control apparatus 7. Accordingly, depending on this, the specific machining and/or the sequence fixed preferably automatically by the device 1 or the control apparatus 7 can be determined. For example, when only one turning tool 5A is present or a milling tool 5B is absent, initial machining by milling can be omitted and instead exclusive machining by turning can take place in the machining of the lens 2 by cutting.

It is noted that the transport container 11 itself can be provided with at least one corresponding or suitable detector apparatus 13B, such as a sensor, microswitch or the like in order to be able to interrogate or acquire the corresponding information such as the presence of an item of equipment, for example, of a corresponding tool. This information is then transmitted or made available, for example, wirelessly or by radio or by cable, for example, by a corresponding electrical terminal, especially when the transport container 11 is joined or attached to the device 1 or the holding apparatus 10, especially so that it can be acquired by the acquisition apparatus 12 and can be further processed or used by the device 1. Preferably, this takes place automatically.

The device or user guide is preferably made for display of a necessary change of a tool 5, especially a turning tool 5A, milling tool 5B and/or polishing tool 5C. This greatly facilitates the use and operation.

Furthermore, especially all necessary items of equipment and/or required manual interventions, such as clamping, reclamping, tool changing or the like are especially displayed and/or monitored in particular by the device 1, control apparatus 7 and/or acquisition apparatus 13 or by the detection apparatus 13A, 13B.

Furthermore, the user guide is preferably made such that the continuation of the machining process and/or the termination of individual machining steps is displayed.

As already mentioned, one especially preferred aspect comprises providing the tool 5 with an information medium 14 or information on one working surface 5D so that identification of the tool 5 or characteristic properties of the tool 5 is enabled by means of the information medium 14 or the information and that in addition the state, especially the state of wear, of the tool 5 can be detected and/or monitored by removal of the information medium 14 or information.

Regardless of the aforementioned, especially preferred aspect, however the other aspects and features described above can also be implemented independently of one another and in any combination.

What is claimed is:

1. A device for machining of an optical component, comprising:
   at least one of a machining apparatus and a polishing apparatus for machining of the optical component,
   at least one tool for the machining of the optical component, and
   an acquisition apparatus for identification of said at least one tool,
   an information medium on a working surface of the at least one tool and having identification information relating to the at least one tool and an indication of the state of the tool, the information medium being removable for displaying of the state of the tool,
   wherein the acquisition apparatus being adapted for identification of the tool and also for acquisition of the state of the tool from the information medium,
   wherein said at least one tool is a plurality of tools,
   wherein a magazine is provide for the plurality of tools, and
   wherein the acquisition apparatus is adapted for identification of the tools and the respective location of each in the magazine for enabling each tool to be replaced at the same location in the magazine after use for machining of the component.

2. The device as claimed in claim 1, wherein the at least one tool comprises a polishing tool.

3. The device as claimed in claim 2, wherein the information medium is located on a polishing surface of the tool.

4. The device as claimed in claim 1, wherein the information medium is imprinted onto a working surface.

5. The device as claimed in claim 1, wherein the information medium comprises a bar code.

6. The device as claimed in claim 1, wherein the acquisition apparatus is an optical device for optical identification of the tool from the information medium.

7. The device as claimed in claim 1, wherein the acquisition apparatus is assigned to a holding apparatus for the at least one tool.

8. A device for machining of an optical component, comprising:
   at least one of a machining apparatus and a polishing apparatus for machining of the optical component,
   at least one tool for the machining of the optical component, and
   an acquisition apparatus for identification of said at least one tool,
   wherein said at least one tool is a plurality of tools and wherein a magazine is provide for the plurality of tools, wherein the acquisition apparatus is adapted for identification of the tools and the respective location of each in the magazine for enabling each tool to be replaced at the same location in the magazine after use for machining of the component.

9. A method for machining of an optical component by means of at least one tool, comprising the steps of:
   using an information medium on a working surface of the tool for identification of the tool, and
   removing the information medium when the optical component is being machined for displaying the state of the tool,
   wherein said at least one tool comprises a plurality of tools kept ready in a magazine for alternate use in machining, and
   wherein said method comprises the step of identifying the tools and the respective location of each in the magazine, and replacing each tool at the same location in the magazine after use for machining of the component.

10. The method as claimed in claim 9, wherein the information medium is optically acquired.

11. The method as claimed in claim 9, wherein the information medium comprises a bar code and the acquisition device comprises a bar code reader which is used to read the bar code.

12. The method as claimed in claim 9, wherein a polishing tool is used as the tool.

13. The method as claimed in claim 12, wherein the information medium is located on a polishing surface of the polishing tool.

14. The method as claimed in claim 9, wherein the information medium is imprinted on the tool.

15. A method for machining of an optical component by means of at least one tool, wherein a plurality of tools is kept ready in a magazine for alternate use in machining, and wherein the method comprises the steps of:
   identifying the tools and the respective location of each in the magazine, and
   replacing each tool at the same location in the magazine after use for machining of the component.

16. The method as claimed in claim 15, wherein a new tool added to the magazine is initially identified along with its location in the magazine using an information medium, and the information later used for returning the tool to the same position in the magazine after use.

17. The method as claimed in claim 15, wherein said method comprises the step of reading out an information medium on a working surface of the tool for acquiring the state of the tool after its use.

18. The method as claimed in claim 17, wherein the state of the tool or the working surface is acquired from the readability or nonreadability of the information medium.

19. A device for machining of an optical component, comprising:
   at least one of a machining apparatus and a polishing apparatus for machining of the optical component,
   at least one tool for the machining of the optical component, and
   an acquisition apparatus for identification of said at least one tool,
   an information medium on a working surface of the at least one tool and having identification information relating to the at least one tool and an indication of the state of the tool, the information medium being removable for displaying of the state of the tool,
   wherein said at least one tool is a plurality of tools,
   wherein a magazine is provided for the plurality of tools,
   wherein the acquisition apparatus is adapted for identification of the tools and also for acquisition of the state of the tools from the information medium, said acquisition apparatus being assigned to the magazine or located on it or in it.

20. A device as claimed in claim 19, wherein the acquisition apparatus is moveable relative to the magazine such that the tools located at different storage sites or their information media can be acquired or read out.

21. A device for machining of an optical component, comprising:
   at least one of a machining apparatus and a polishing apparatus for machining of the optical component,
   at least one tool for the machining of the optical component, and
   an acquisition apparatus for identification of said at least one tool,
   an information medium on a working surface of the at least one tool and having identification information relating to the at least one tool and an indication of the state of the tool, the information medium being removable for displaying of the state of the tool,
wherein the acquisition apparatus is adapted for identification of the tool, for acquisition of the state of the tool from the information medium and for detecting possible cracks, chips, or other irregularities or damage of the tool or of the working surface.

22. A method for machining of an optical component by means of at least one tool, comprising the steps of:
using an information medium on a working surface of the tool for identification of the tool, and
removing the information medium when the optical component is being machined for displaying the state of the tool,
wherein said at least one tool is a plurality of tools kept ready in a magazine for alternate use in machining, and
wherein monitoring or acquisition of the state of the tools takes place on the magazine.

* * * * *